US010576686B2

(12) United States Patent
Wu

(10) Patent No.: US 10,576,686 B2
(45) Date of Patent: Mar. 3, 2020

(54) FORMATION PLATFORM FOR THREE-DIMENSIONAL PRINTING DEVICE

(71) Applicants:XYZPRINTING, INC., New Taipei (TW); KINPO ELECTRONICS, INC., New Taipei (TW)

(72) Inventor: Chi-Chieh Wu, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 306 days.

(21) Appl. No.: 15/871,003

(22) Filed: Jan. 14, 2018

(65) Prior Publication Data

US 2019/0054692 A1 Feb. 21, 2019

(30) Foreign Application Priority Data

Aug. 21, 2017 (CN) .......................... 2017 1 0718267

(51) Int. Cl.
*B29C 64/245* (2017.01)
*B33Y 30/00* (2015.01)
*B29C 64/118* (2017.01)

(52) U.S. Cl.
CPC ............ *B29C 64/245* (2017.08); *B33Y 30/00* (2014.12); *B29C 64/118* (2017.08)

(58) Field of Classification Search
CPC ............................... B29C 64/245; B33Y 30/00
See application file for complete search history.

(56) References Cited

U.S. PATENT DOCUMENTS

| 2016/0031160 | A1 | 2/2016 | Din et al. |
| 2016/0052207 | A1 | 2/2016 | Bloom |
| 2016/0297110 | A1* | 10/2016 | Wu ........................ B29C 35/16 |

(Continued)

OTHER PUBLICATIONS

Jalr: "Ultimaker Easy Ben Leveling", Jul. 25, 2013, XP055502068, retrieved from the Internet: URL:https://www.thingiverse.com/thing:106576 [retrieved on Aug. 24, 2018] Fig. 1.

(Continued)

*Primary Examiner* — Robert B Davis
(74) *Attorney, Agent, or Firm* — Chun-Ming Shih; HDLS IPR Services

(57) ABSTRACT

A formation platform for a three-dimensional printing device is provided. The formation platform includes a base (100), one or more positioning assemblies (200), a substrate (300), and one or more calibration assemblies (400). The positioning assembly (200) includes a damper (210) and a resilient element (220), the damper (210) is movably disposed at the base (100), and the resilient element (220) is associated with the clamper (210) to push the clamper (210) toward the base (100). The substrate (300) is disposed on the base (100), and a portion of an edge of the substrate (300) is compressed by the damper (210) to fix the substrate on the base (100). The calibration assembly (400) includes a screw rod (410); the screw rod (410) is disposed on the base (100) and in contact with the substrate (300). By the positioning assembly (200) collaborating with the calibration assembly (400), horizontal adjustment of the substrate (300) can be made, and the substrate (300) can be easily installed or removed.

15 Claims, 10 Drawing Sheets

(56) References Cited

U.S. PATENT DOCUMENTS

2017/0043538 A1 2/2017 Chang et al.
2019/0061244 A1* 2/2019 Wu ..................... B29C 64/245

OTHER PUBLICATIONS

Harmawoldhuis: "Ultimaker 2 Assembly manual", Apr. 8, 2014, XP055502080, retrieved from the Internet: URL:https://github.com/Ultimaker/Ultimaker2/raw/master/um2%20assembly%20manual%20V1.1%20_english.pdf [retrieved on Aug. 24, 2018] pp. 22-25.
Search Report dated Sep. 27, 2018 of the corresponding European patent applicaiton.

\* cited by examiner

FORMATION PLATFORM FOR THREE-DIMENSIONAL PRINTING DEVICE

BACKGROUND OF THE INVENTION

Field of the Invention

The present disclosure relates to a three-dimensional printing device and, in particular, to a formation platform for a three-dimensional printing device, which facilitates horizontal adjustment and easy installment/removal.

Description of Related Art

Fused deposition modeling (FDM) is one of the techniques used for 3D printing. In FDM, a filament is melted, and a nozzle selectively dispenses the melted material on a platform according to a cross-sectional outline of an image in the loaded image file. After cooled, the material is solidified to form a layer. Upon completion of each layer, the platform is lowered downward an amount approximately equal to the thickness of the next layer. The process goes on until the entire three-dimensional (3D) object is built up. The 3D object is adhered to the platform, but the nozzle is arranged above the platform, so it is not easy to remove the finished object from the platform. To overcome this problem, conventional techniques provides a platform with removable plate to facilitate removal of the finished 3D object. However, this design has a problem that, the platform may not be in a horizontal position after the platform is disassembled. In order to adjust the horizontal position, the platform needs additional mechanism to handle the horizontal adjustment. As a result, the machine is of a very large size, leading to inconvenient use and control of the large machine.

In views of this, in order to solve the above disadvantages, the present inventor studied related technology and provided a reasonable and effective solution in the present disclosure.

SUMMARY OF THE INVENTION

The present disclosure provides a formation platform for a three-dimensional (3D) printing device, which facilitates horizontal adjustment and easy installation and removal.

The present disclosure provides a formation platform for a 3D printing device. The formation platform includes a base, a positioning assembly, a substrate, and a calibration assembly. The positioning assembly includes a damper and a resilient element. The resilient element is associated with the clamper to move the damper toward the base. The substrate is disposed on the base, a portion of an edge of the substrate is compressed by the damper to fix the substrate to the base. The calibration assembly includes a screw rod; the screw rod is disposed on the base and is in contact with the substrate.

In the formation platform for the 3D printing device, the positioning assembly is disposed adjacent to the calibration assembly. The positioning assembly and the calibration assembly are disposed at one corner of the substrate.

The formation platform for the 3D printing device further comprises another positioning assembly, and the calibration assembly is disposed between the two positioning assemblies. The two positioning assemblies and the calibration assembly are disposed along one side edge of the substrate.

In the formation platform for the 3D printing device, the positioning assembly includes a slide rod, the slide rod is movably inserted through the base, the resilient element is connected between one end of the slide rod and the base, and the clamper is disposed at the other end of the slide rod. The slide rod is inserted through the resilient element.

In the formation platform for the 3D printing device, the positioning assembly includes a slide rod, one end of the slide rod is associated with the base, the resilient element is pre-compressed and is connected between the other end of the slide rod and the base, and the damper is clamped between the resilient element and the base. The slide rod is inserted through the resilient element.

In the formation platform for the 3D printing device, the calibration assembly includes a resilient element; the resilient element pushes the base and the screw rod to tightly fix the base and the screw rod. The screw rod is inserted through the resilient element, and the resilient element pushes the base and the other end of the screw rod. The screw rod penetrates the base. One end of the screw rod is in contact with the substrate. The screw rod is screw-connected to the base for horizontal adjustment of the substrate. The base is fixed to a machine body of a 3D printing device or is fixed to a movable mechanism of the 3D printing device to move together during printing.

The formation platform for the 3D printing device further comprises another positioning assembly having another damper fixed to the base.

By the positioning assembly collaborating with the calibration assembly, horizontal adjustment of the substrate can be made, and easy installation and removal can be achieved.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION OF THE INVENTION

Figure 1:
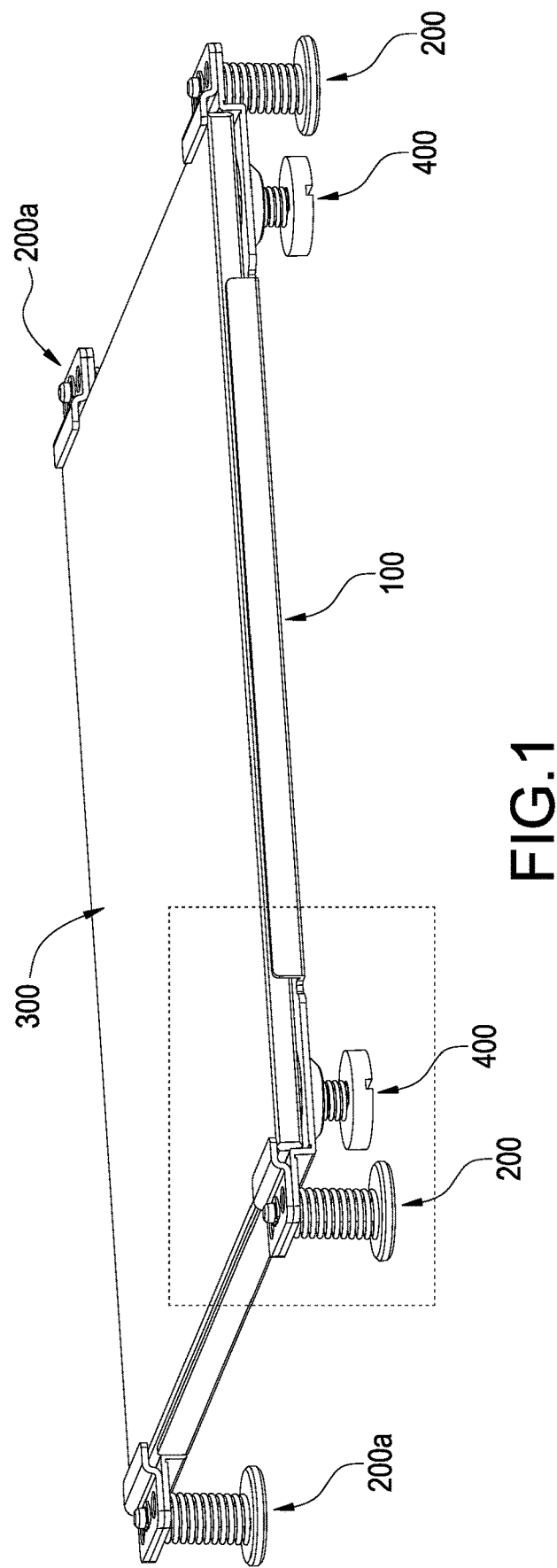
FIGS. 1 to 3 are perspective views illustrating a formation platform for a three-dimensional (3D) printing device according to one embodiment of the present disclosure.

Referring to FIGS. 1 to 5, one embodiment of the present disclosure provides a formation platform for a three-dimensional (3D) printing device. The formation platform includes a base 100, at least one positioning assembly 200/200a, a substrate 300, and at least one calibration assembly 400/400a.

In the present embodiment, the base 100 is preferably a plate made of metal; however, the present disclosure is not limited in this regard. The base 100 is fixed to the 3D printing device and is used to support the substrate 300. In the present embodiment, the base 100 preferably includes a through hole, so that the 3D printing device can be fixed to a machine body of the 3D printing device. Therefore, the base 100 is unable to move with respect to the machine body, and the substrate 300 is movable with respect to the machine body for making horizontal adjustment. In another embodiment, the base 100 preferably includes a through hole, so that the base 100 can be fastened to a movable mechanism of the 3D printing device and can move together with the movable mechanism, horizontally (X and Y axis directions) or vertically (a Z axis direction), during printing. Therefore, horizontal adjustment of the base 100 with respect to the machine body cannot be carried out, but the substrate 300 is movable with respect to the machine body for making horizontal adjustment of the substrate 300.

In the present embodiment, there are preferably four positioning assemblies 200/200a disposed on the base 100 to compress and fix the substrate 300. In the present embodiment, one positioning assembly 200 is described for brevity; the positioning assembly 200 includes a damper 210, a resilient element 220 and a slide rod 230. The slide rod 230 is disposed on the base 100 and is associated with the damper 210, and the damper 210 is thereby movably disposed on the base 100. The resilient element 220 is associated with the damper 210, so that the damper 210 is pushed toward the base 100 to compress the substrate 300.

In the present embodiment, it is preferable that the slide rod 230 is movably inserted through the base 100, and one end of the slide rod 230 penetrates the clamper 210, so that the damper 210 is movably disposed on the base 100. The resilient element 220 is connected between one end of the slide rod 230 and the base 100, and the resilient element 220 drives the damper 210 by means of the slide rod 230. In the present embodiment, two flanges 231, 232 protrude from two ends of the slide rod 230 respectively for contact with the damper 210 and the resilient element 220. The resilient element 220 is preferably a cylindrical spring. The slide rod 230 is inserted through the resilient element 220. The resilient element is pre-compressed, so that two ends of the resilient element 220 respectively push the base 100 and the corresponding flange 232 on the slide rod 230. The resilient element 220 is associated with the slide rod 230, and the resilient element 220 pushes the clamper 210 toward the base 100 by means of the flange 231 at the other end of the slide rod 230.

Figure 6:
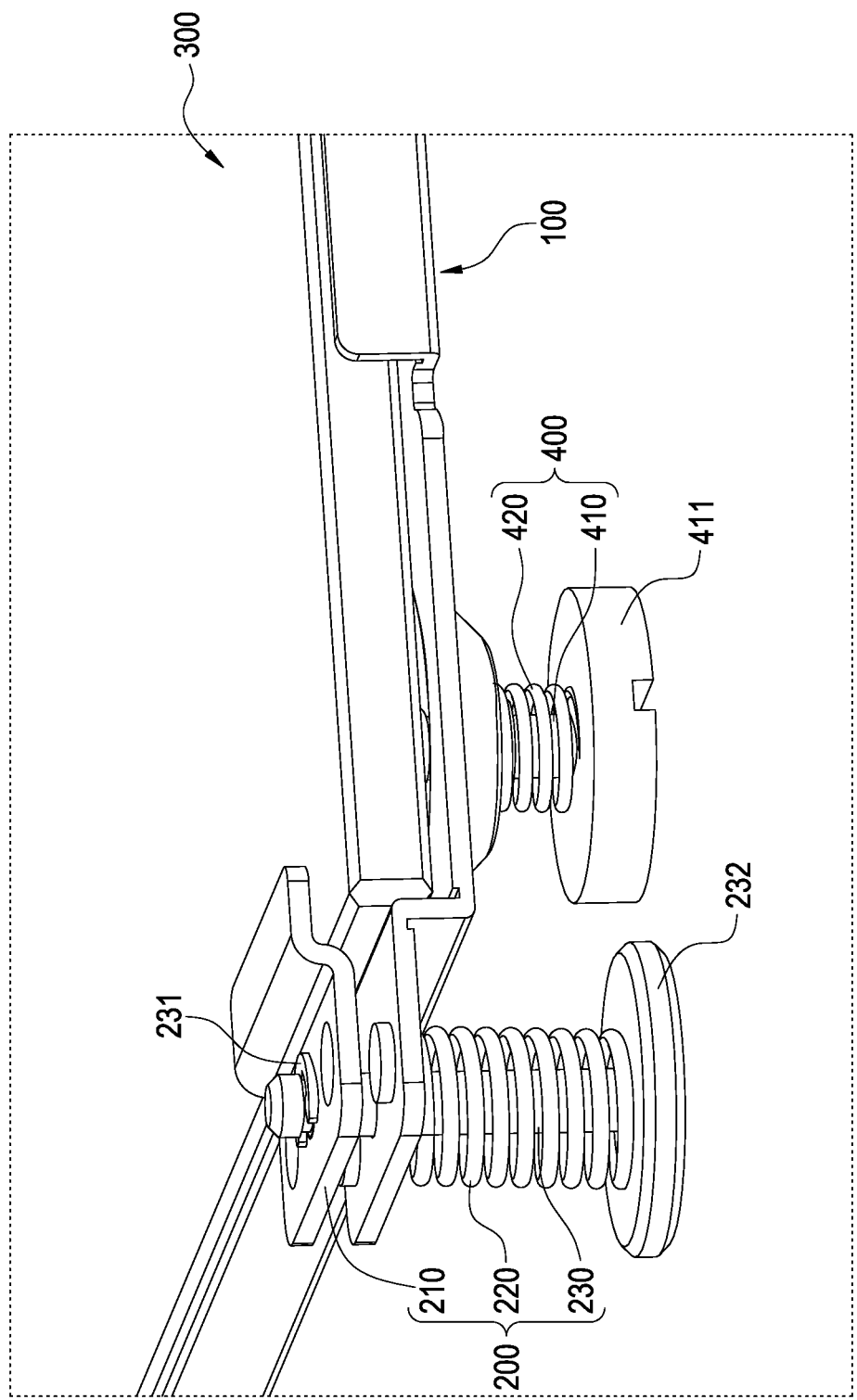
FIGS. 6 to 8 are schematic in-use views showing the formation platform for the 3D printing device according to one embodiment of the present disclosure.
Figure 7:
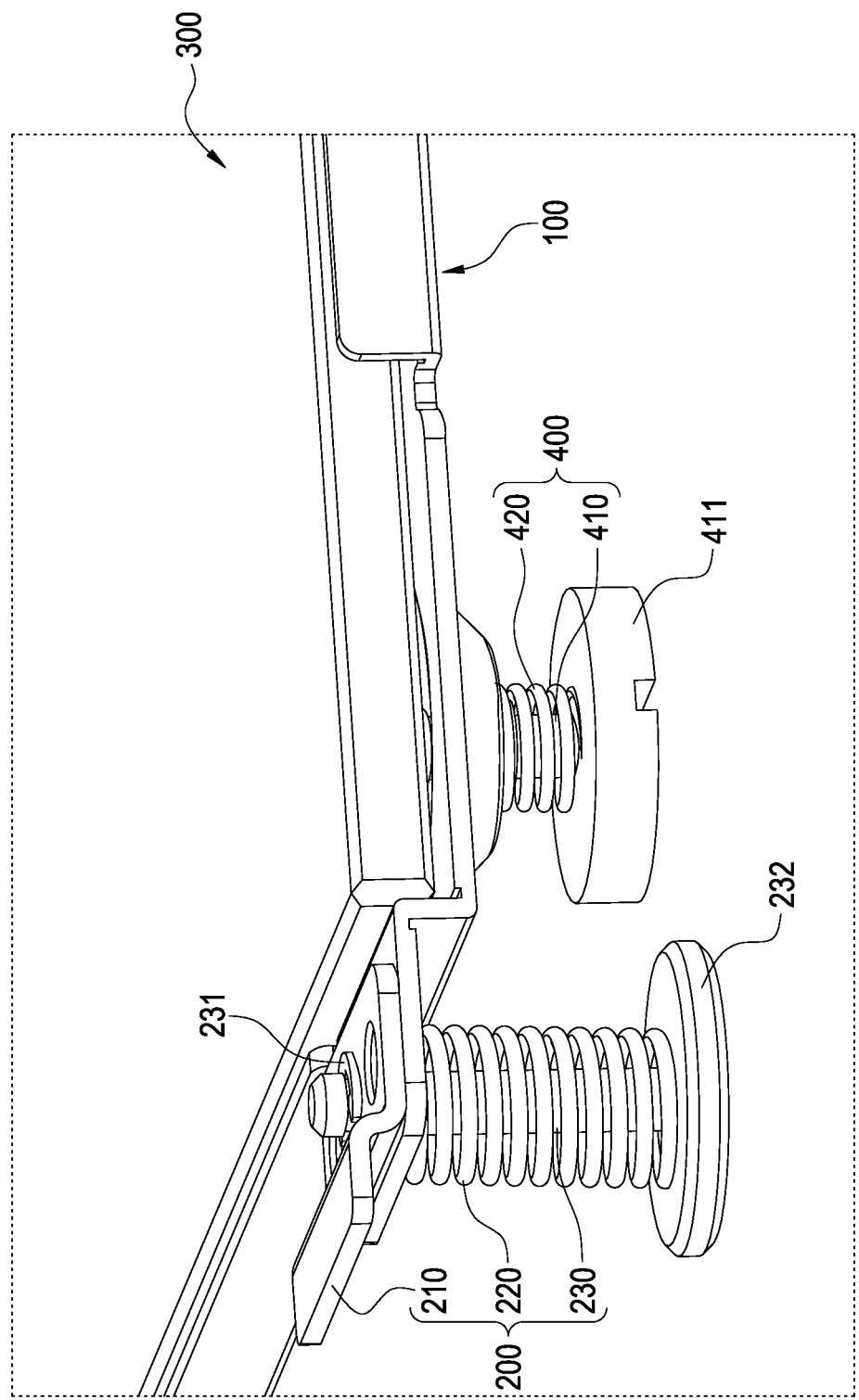
Figure 8:
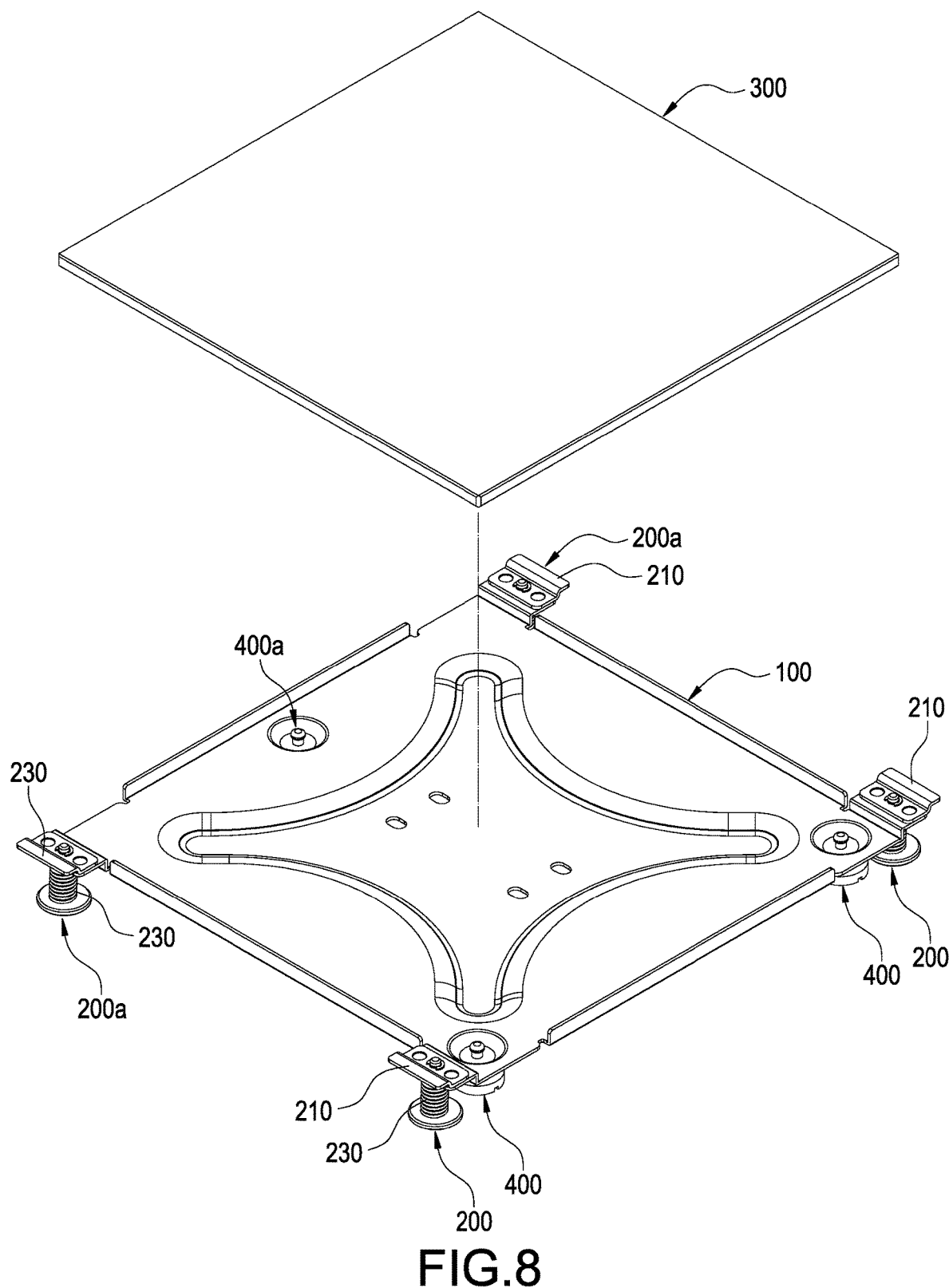

Referring to FIGS. 6 to 8, in the present embodiment, the substrate 300 is preferably a rectangular plate; however, the present disclosure is not limited in this regard. The substrate 300 is disposed on the base 100 for printing a 3D object on the substrate 300. In the present embodiment, the substrate 300 is preferably placed on the base 100, and each positioning assembly 200/200a compresses a portion of an edge of the substrate 300, so as to fix the substrate 300 on the base 100. It is preferable that, the positioning assemblies 200, 200a clamp four corners of the substrate 300, respectively. An operator can axially push one end of the slide rod 230 opposite to the damper 210 to compress the resilient element 220, and the flange 231 of the damper 210 is thereby removed from the damper 210, so that the damper 210 can be rotated or elevated to facilitate installing or removing the substrate 300.

Figure 2:
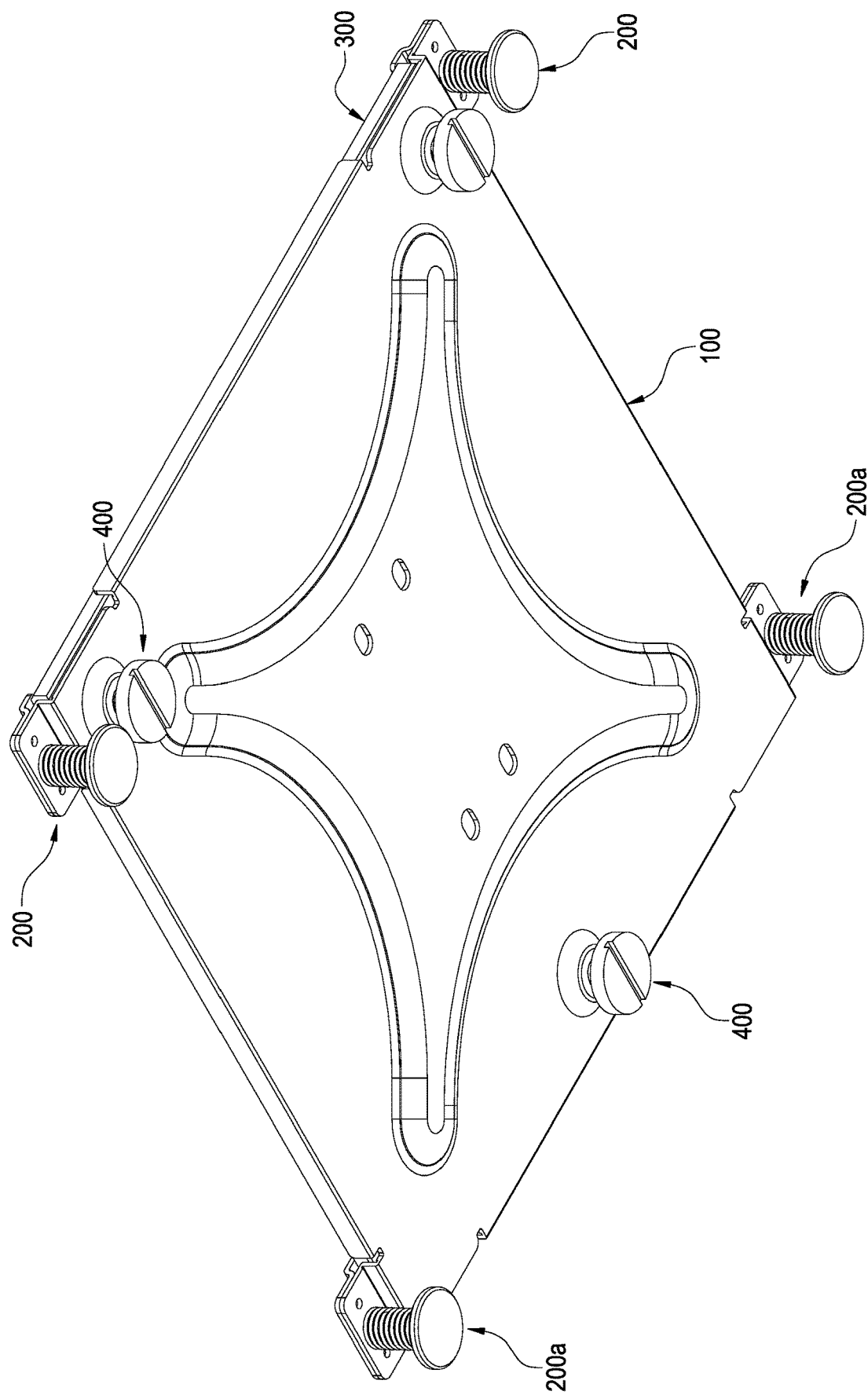
Figure 3:
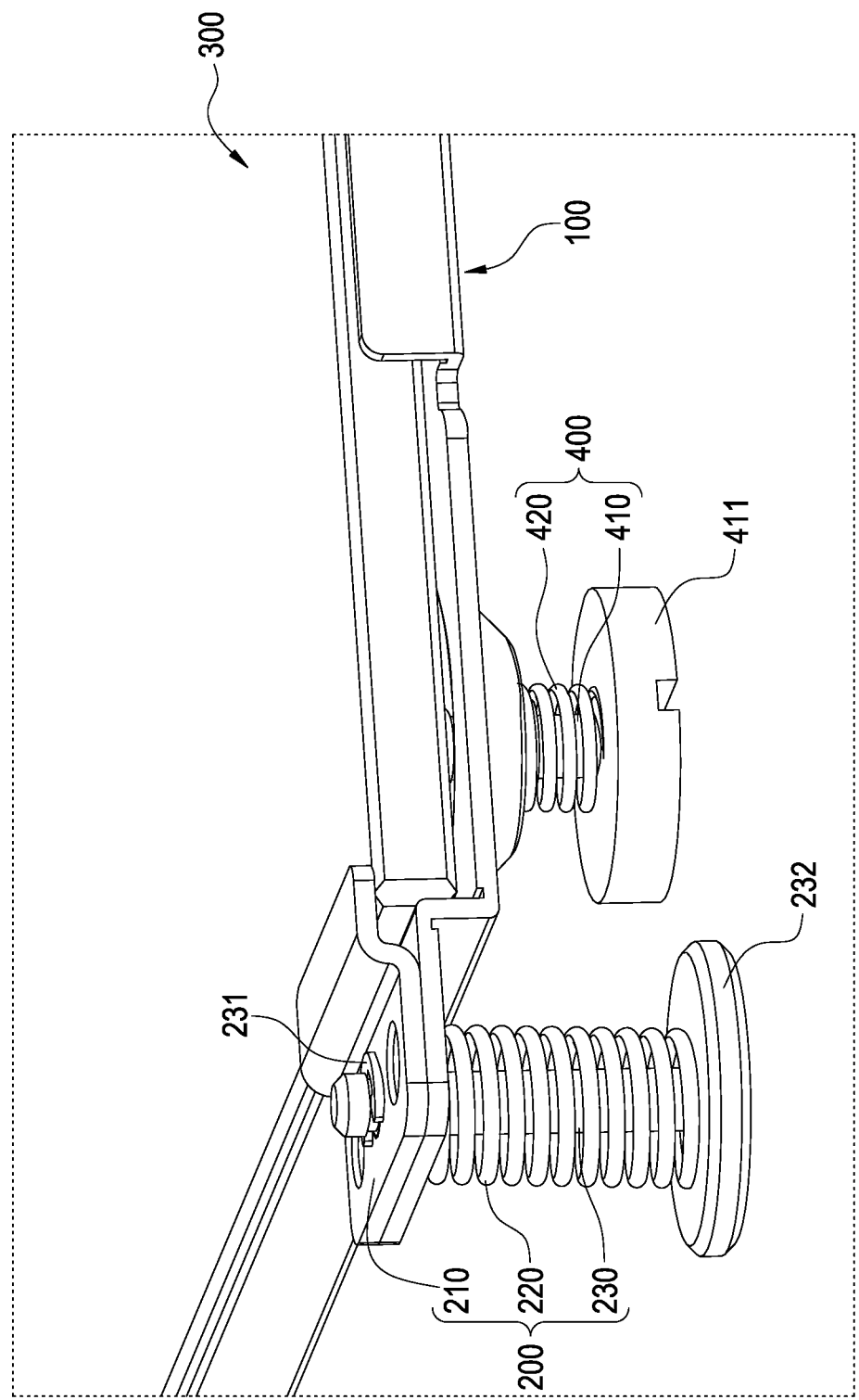
Figure 4:
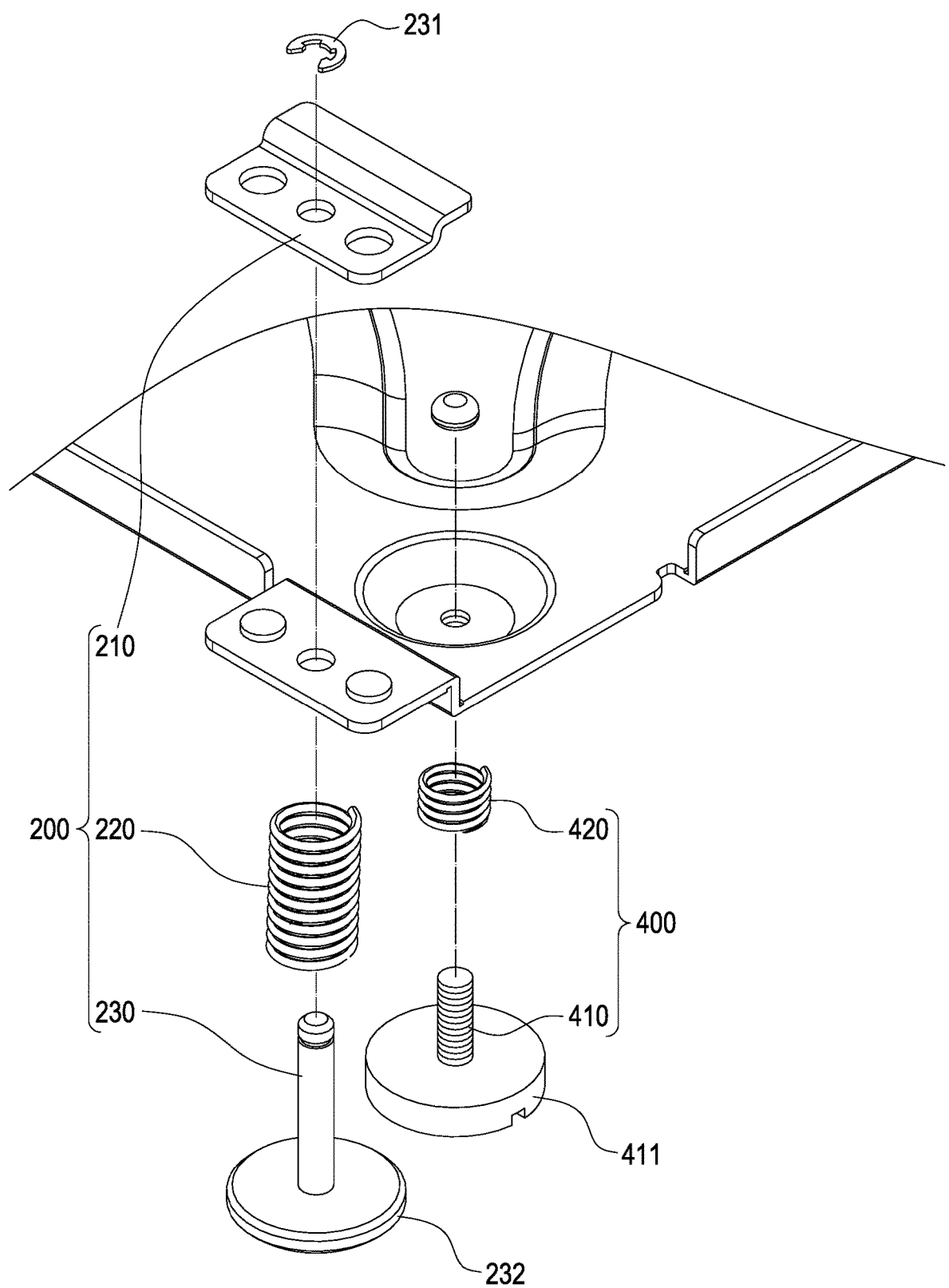
FIG. 4 is a perspective exploded view illustrating the formation platform for the 3D printing device according to one embodiment of the present disclosure.
Figure 5:
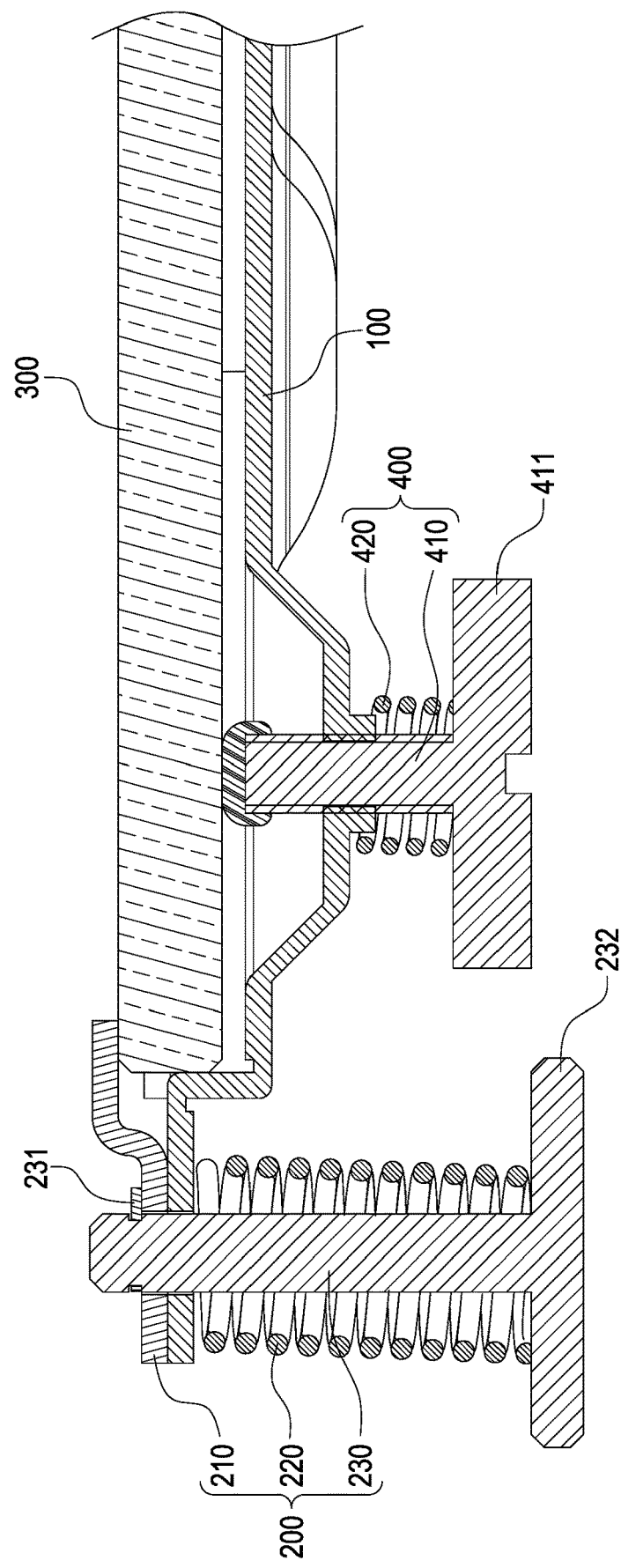
FIG. 5 is a cross-sectional view illustrating the formation platform for the 3D printing device according to one embodiment of the present disclosure.

Referring to FIGS. 2, 5, and 8, in the present embodiment, there are preferably three calibration assemblies 400/400a disposed on the base 100. In the present embodiment, one calibration assembly 400 is described for brevity. The calibration assembly 400 includes a screw rod 410 and a resilient element 420. The screw rod 410 penetrates the base 100 and is screw-connected to the base 100, and one end of the screw rod 410 is in contact with the substrate 300. The resilient element 420 pushes the base 100 and the screw rod 410 to tightly fix the base 100 and the screw rod 410. In the present embodiment, it is preferable that a flange 411 laterally protrudes from the other end of the screw rod 410, and the resilient element 420 is preferably a cylindrical spring. The screw rod 410 is inserted through the resilient element 420. The resilient element 420 is pre-compressed, so that two ends of the resilient element 420 pushes the base 100 and the flange 411 of the screw rod 410 to tightly fasten the screw rod 410.

In the formation platform for the 3D printing device, the positioning assembly 200/200a is used to compress and fix the substrate 300 onto the base 100, and each calibration assembly 400/400a is used to adjust a height position of the substrate 300, and three calibration assemblies 400/400a are used to adjust the height positions of three spots located on the substrate 300, thereby achieving horizontal adjustment of the substrate 300.

In the formation platform for the 3D printing device, the positioning assembly 200/200a collaborates with the corresponding calibration assembly 400/400a, so that horizontal adjustment of the substrate 300 can be made. To be specific, the positioning assembly 200/200a compresses the substrate 300 by the elastic force of the resilient element 220. While the calibration assembly 400/400a changes the height position of the substrate 300, the damper 210 of each positioning assembly 200/200a can be moved to allow the calibration assembly 400/400a to elevate the substrate 300 to change the height position of the substrate 300, and the operator can push the damper 210 to release the substrate 300. Accordingly, the horizontal adjustment of the substrate 300 can be made and the substrate 300 can be installed or removed easily.

In the formation platform for the 3D printing device, two calibration assemblies 400 are arranged at two adjacent corners of the substrate 300 and are adjacent to the positioning assemblies 200 located at these two corners. Another calibration assembly 400a is disposed between the other two positioning assemblies 200a, and the two positioning assemblies 200a and the calibration assembly 400a are disposed along one side edge of the substrate 300.

Figure 9:
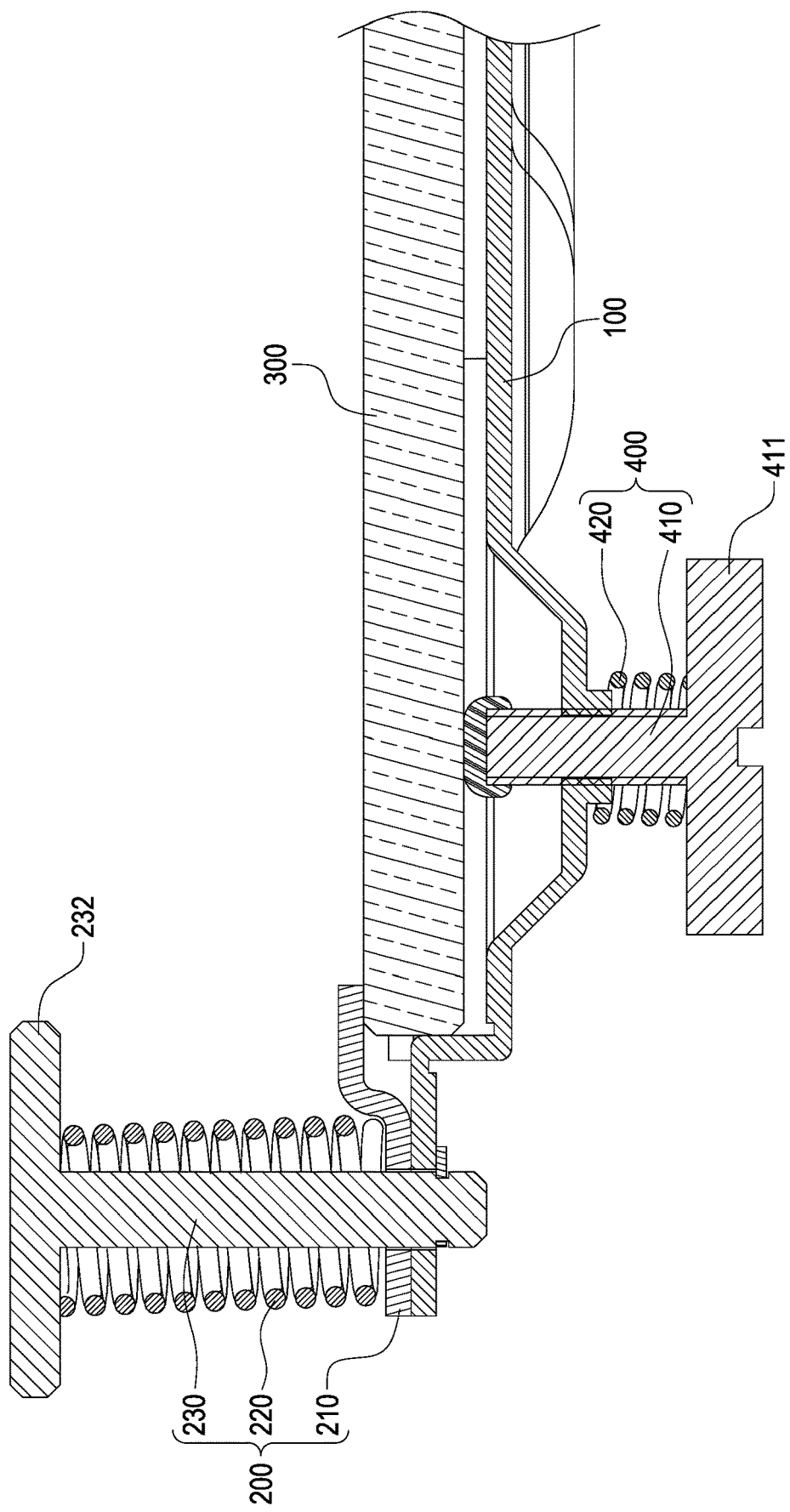
FIG. 9 is a schematic view showing a positioning assembly according to another embodiment of the present disclosure.

FIG. 9 shows the positioning assembly 200 according to another embodiment of the present disclosure. One end of the slide rod 230 of the positioning assembly 200 is connected (in a contact manner or in a fixed manner) to the base 100. The slide rod 230 is inserted through the resilient element 220 and the clamper 210, so that the damper 210 is movable along the slide rod 230. The resilient element 220 is pre-compressed and is connected between the other end of the slide rod 230 and the clamper 210, so that the damper 210 is clamped between the resilient element 220 and the base 100. While the substrate 300 is disposed between the damper 210 and the base 100, the resilient element 220 exerts force to the damper 210 to make the damper 210 compress the substrate 300. While the calibration assembly 400 changes the height position of the substrate 300, the damper 210 of the positioning assembly 200 is movable to allow the calibration assembly 400 to elevate the substrate 300 to change its position. Moreover, the operator can push the damper 210 to release the substrate 300. Therefore, horizontal adjustment of the substrate 300 can be made, and the substrate 300 can be installed or removed easily.

Figure 10:
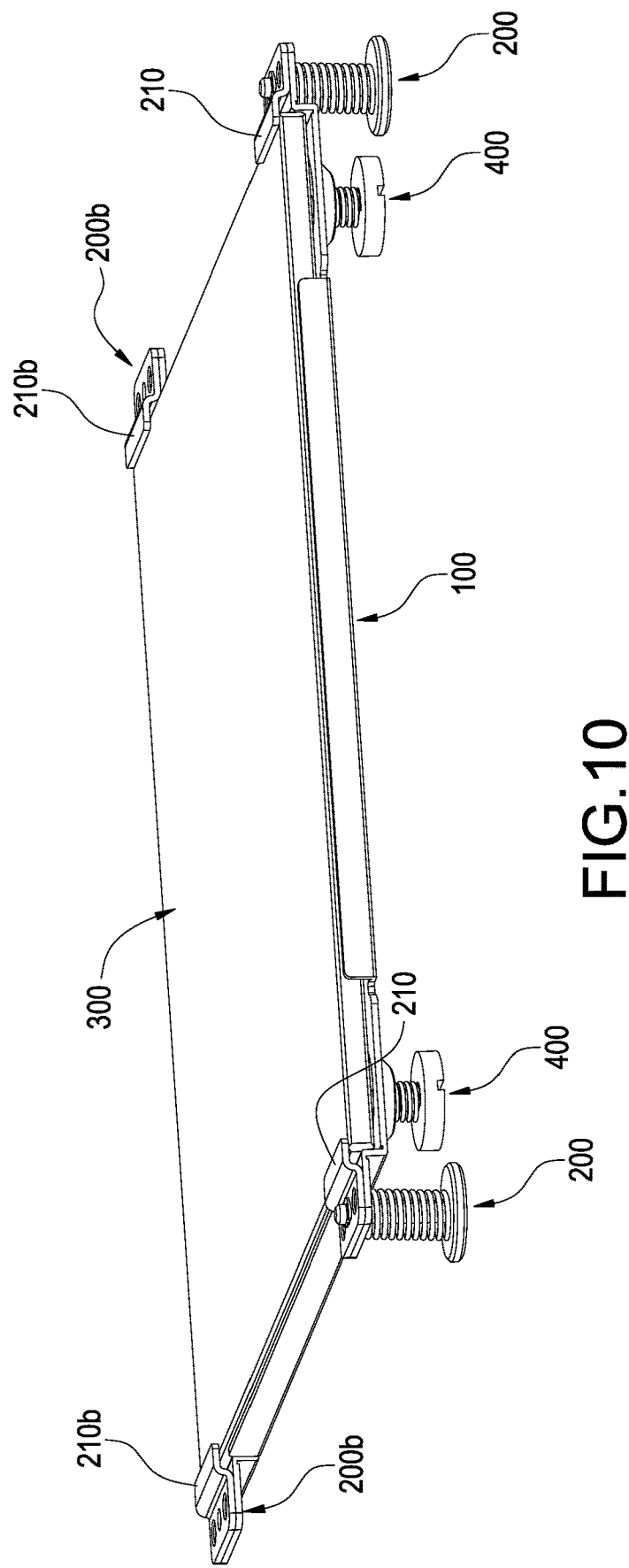
FIG. 10 is a schematic view illustrating the positioning assembly according to still another embodiment of the present disclosure.

Referring to FIG. 10, in the formation platform for the 3D printing device, a portion of the positioning assembly 200b can be fixed to the base 100 by welding to form a fixed-type positioning assembly 200b. To be specific, the fixed-type positioning assembly 200b can only include a fixed-type damper 210b which can be fixed to the base 100 by welding. To detach the substrate 300, the operator can rotate or elevate the damper 210 of the positioning assembly 200, and then horizontally pull the substrate 300 to remove it from the fixed-type positioning assembly 200b. In a reverse sequence, the operator can install the substrate 300. It is to be understood that the above descriptions are merely the preferable embodiments of the present disclosure and are not intended to limit the scope of the present disclosure. Equivalent changes and modifications made in the spirit of the present disclosure are regarded as falling within the scope of the present disclosure.

What is claimed is:

1. A formation platform for a three-dimensional printing device, comprising:
    a base (100);
    a positioning assembly (200/200a) including a damper (210) and a resilient element (220), the clamper (210) being movably disposed at the base (100), and the resilient element (220) being associated with the damper (210) to move the damper (210) toward the base (100);
    a substrate (300) disposed on the base (100), a portion of an edge of the substrate (300) being compressed by the damper (210) to fix the substrate (300) to the base (100); and
    a calibration assembly (400/400a) including a screw rod (410), the screw rod (410) being disposed on the base (100) and in contact with the substrate (300).

2. The formation platform for the three-dimensional printing device according to claim 1, wherein the positioning assembly (200) is disposed adjacent to the calibration assembly (400).

3. The formation platform for the three-dimensional printing device according to claim 2, wherein the positioning assembly (200) and the calibration assembly (400) are disposed at one corner of the substrate (300).

4. The formation platform for the three-dimensional printing device according to claim 1, further comprising another positioning assembly (200a), the calibration assembly (400a) being disposed between the two positioning assemblies (200a).

5. The formation platform for the three-dimensional printing device according to claim 4, wherein the two positioning assemblies (200a) and the calibration assembly (400a) are disposed along one side edge of the substrate (300).

6. The formation platform for the three-dimensional printing device according to claim 1, wherein the positioning assembly (200/200a) includes a slide rod (230), the slide rod (230) is movably inserted through the base (100), the resilient element (220) is connected between one end of the slide rod (230) and the base (100), and the damper (210) is disposed at the other end of the slide rod (230).

7. The formation platform for the three-dimensional printing device according to claim 6, wherein the slide rod (230) is inserted through the resilient element (220).

8. The formation platform for the three-dimensional printing device according to claim 1, wherein the positioning assembly (200/200a) includes a slide rod (230), one end of the slide rod (230) is associated with the base (100), the resilient element (220) is pre-compressed and is connected between the other end of the slide rod (230) and the base (100), and the damper (210) is clamped between the resilient element (220) and the base (100).

9. The formation platform for the three-dimensional printing device according to claim 8, wherein the slide rod (230) is inserted through the resilient element (220).

10. The formation platform for the three-dimensional printing device according to claim 1, wherein the calibration assembly (400/400a) includes a resilient element (420), the resilient element (420) pushes the base (100) and the screw rod (410) to tightly fix the base (100) and the screw rod (410).

11. The formation platform for the three-dimensional printing device according to claim 10, wherein the screw rod (410) is inserted through the resilient element (420), and the resilient element (420) pushes the base (100) and the other end of the screw rod (410).

12. The formation platform for the three-dimensional printing device according to claim 1, wherein the screw rod (410) penetrates the base (100).

13. The formation platform for the three-dimensional printing device according to claim 1, wherein the base (100) is fixed to a machine body of the three-dimensional printing device or is fixed to a movable mechanism of the three-dimensional printing device to move together during printing.

14. The formation platform for the three-dimensional printing device according to claim 1, wherein the screw rod (410) is screw-connected to the base (100) for horizontal adjustment of the substrate (300).

15. The formation platform for the three-dimensional printing device according to claim 1, further comprising another positioning assembly (200b) including another damper (210b) fixed to the base (100).

* * * * *